F. C. COSEO.
CABLE REELING MECHANISM.
APPLICATION FILED AUG. 4, 1911.

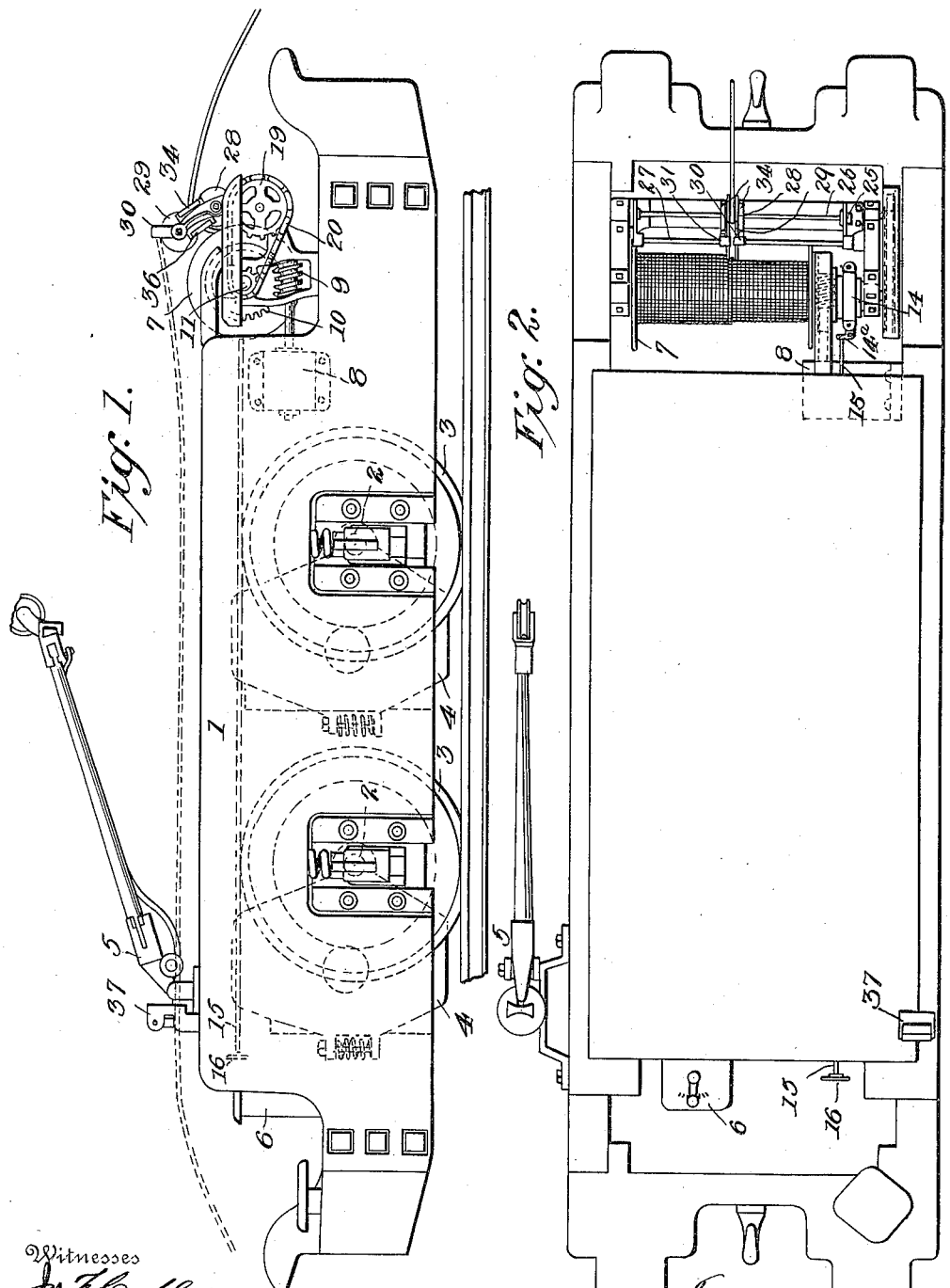

1,090,973.

Patented Mar. 24, 1914.
2 SHEETS—SHEET 2.

Witnesses
Jo. F. Collins
S. Jay Teller

Inventor
Frederick C. Coseo
By H. H. Bliss
Attorney

UNITED STATES PATENT OFFICE.

FREDERICK C. COSEO, OF COLUMBUS, OHIO, ASSIGNOR TO THE JEFFREY MANUFACTURING COMPANY, A CORPORATION OF OHIO.

CABLE-REELING MECHANISM.

1,090,973. Specification of Letters Patent. Patented Mar. 24, 1914.

Application filed August 4, 1911. Serial No. 642,391.

*To all whom it may concern:*

Be it known that I, FREDERICK C. COSEO, a citizen of the United States, residing at Columbus, in the county of Franklin and State of Ohio, have invented certain new and useful Improvements in Cable-Reeling Mechanisms, of which the following is a specification, reference being had therein to the accompanying drawing.

The general constructon and mode of operation of electric locomotives having cable reeling mechanisms are now well known and understood. These locomotives are used principally in mines for collecting together into trains loaded mine cars from branch entries and from various rooms in which cutting operations are being carried on. The rooms and branch entries are provided with tracks, but not with current supply wires. Therefore, when it is desired to operate a locomotive in one of the branch entries or rooms the cable reeling mechanism is used to carry and to wind and unwind a conductor cable, the free end of which is secured to a stationary electric conductor, such as a trolley wire. In this way current is carried from the stationary electric conductor to the locomotive while it is operating over tracks in the branch entries and rooms.

The object of this invention is to provide an improved means for controlling the winding of the cable reel onto the reel, the guiding means being adapted to permit the cable being taken up or paid out at either end of the locomotive.

Figure 3:
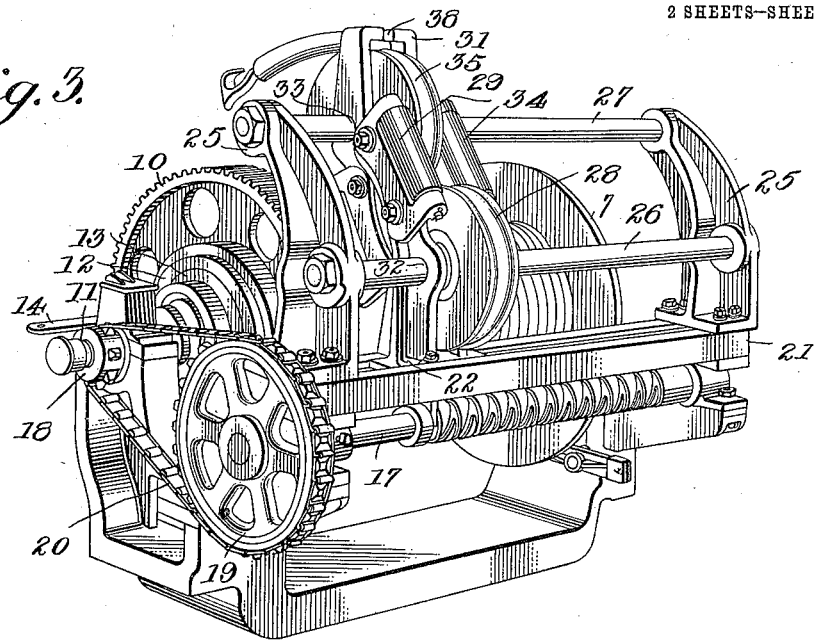
Figure 4:
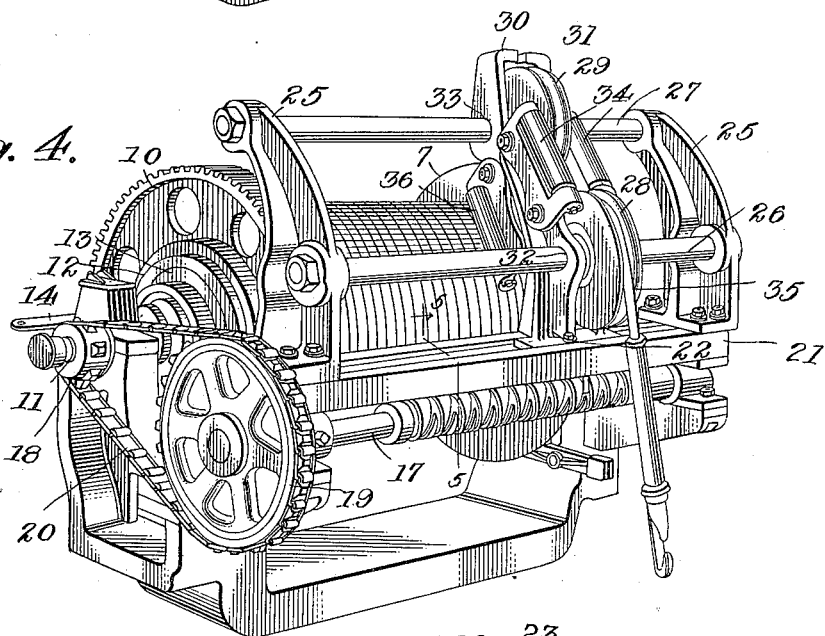
Figure 5:
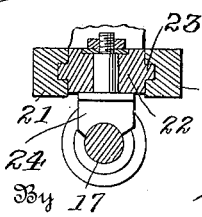

In the accompanying drawings which show the embodiment of my invention which I now deem preferable, Figure 1 is a side elevation of a locomotive having a cable guiding mechanism embodying my improvements; Fig. 2 is a plan view of the locomotive shown in Fig. 1; Fig. 3 is a perspective view of the reel, the guiding mechanism and associated parts detached from the locomotive; Fig. 4 is a view similar to Fig. 3, with the cable extending in the opposite direction; Fig. 5 is a fragmentary cross sectional view taken along line 5—5 of Fig. 4.

Referring to the drawings, 1 represents as a whole, an electric locomotive which may be of any of the usual forms. It is mounted upon axles 2 and track wheels 3, and is driven by means of motors 4.

5 is a trolley mechanism of the usual form for supplying current to the locomotive motors under normal conditions.

At one end of the locomotive is a space for the operator and at this end of the locomotive are provided the locomotive controlling devices such as the controller 6. At the other end of the locomotive is mounted the cable reeling mechanism. This mechanism comprises a reel 7 mounted to rotate about a horizontal axis. The details of construction of the reel and of the reel actuating mechanism form no part of my present invention.

The construction which I have shown comprises an electric motor 8 which is separate from and operable independently of the main motor and of the track wheels and which has connected with it a worm 9 meshing with a worm wheel 10 rotatable on the shaft 11 of the reel. Secured to the worm wheel 10 is one element 12 of a friction clutch. The other element 13 of the clutch is splined to the shaft 11 and its movement along the shaft into and out of engagement with the clutch element 12 is controlled by means of a pivoted ring 14 connected with a bell crank 14ª. This bell crank has connected with it a link 15 which extends backward and has secured to it a handle 16 within the reach of the operator. The operator, therefore, by moving the handle 16 may cause the clutch to be engaged or disengaged and the motor 8 to be connected with or disconnected from the reel.

Mounted in suitable bearings at one side of the reel and parallel to the axis thereof is a rotatable shaft 17 which is provided with double or reversely pitched cam screw threads. At one end of the reel shaft 11 is a sprocket pinion 18 and at the corresponding end of the shaft 17 is a sprocket wheel 19. A chain 20 extends over the pinion 18 and the wheel 19 and serves to transmit power to rotate the shaft 17 at a relatively slow speed.

Mounted above the shaft 17 are two parallel guide bars 21, 21, which are preferably provided at their adjacent sides with longitudinal grooves.

22 is a carriage or traveler block having at opposite sides tongues 23 adapted to extend into and be guided by the grooves in the bars 21.

24 is a follower stud pivotally mounted in the block 22. This stud has a downward projection adapted to engage the walls of the threads on the shaft 17 and as the shaft is rotated to direct the traveler block backward and forward along its guide-way.

Mounted on the frame of the reel mechanism at points above the ends of the shaft 17 and the guide bars 21 are two parallel upstanding brackets 25, 25. Mounted in these up-standing brackets are two parallel horizontal transverse shafts 26, and 27. The lower of these shafts 26 is preferably directly above the guide bars 21 and the upper of the shafts 27 is preferably behind the shaft 26 and nearer the vertical plane of the reel axis. Rotatably mounted on the shaft 26 is a cable guide sheave 28. On the shaft 27 is a similar sheave 29. These sheaves are so spaced by the shafts 26 and 27 that they can coöperate with each other to guide the cable 35 between them. The traveler block 22 carries two upward and forward extending arms 30 and 31 which have bearings at 32 and 33 on the transverse shafts or bars 26 and 27. These arms 30 and 31 are positioned at opposite sides of the sheaves 28 and 29 and serve to move the sheaves backward and forward along the shafts 26 and 27. Preferably the arms 30 and 31 carry rollers 34 positioned in longitudinal vertical planes at opposite sides of the sheaves 28 and 29. These rollers are adapted to guide the cable 35 as it passes between the sheaves in being wound and also to guide it as it passes from the sheaves in being unwound. Preferably other rollers 36 are provided on the arms 30 and 31 for guiding the cable at a point between the sheaves and the reel.

In operation let it be assumed that it is desired to pay out and take up the cable at the forward end i. e. at the end opposite to that at which the operator is positioned. The cable is passed forward in engagement with the lower sheave 28, as shown in Fig. 4, and its forward end is connected with a suitable stationary conductor. The motors 4 are then energized to drive the locomotive away from the point of attachment of the cable. During such movement of the locomotive the motor 8 may be energized or not, as the operator desires. In either case the clutch elements 12 and 13 are permitted to be in engagement and on account of friction between them resistance will be offered to the rotation of the reel in the unwinding direction. In this way a proper tension on the cable is insured. It will be understood of course that when the motor is not energized the worm gearing 9 and 10 will prevent rotation of the motor by the reel in the reverse direction. When the movement of the locomotive away from the point of attachment of the cable has ceased and it is desired to cause the return movement of the locomotive, care is taken that the motor 8 is energized and operating whether it has been previously energized or not. As the locomotive returns the reel is rotated by the motor 8 in the winding direction and the cable is guided onto the reel in regular order by means of the sheaves 28 and 31 and the rollers 36 on the reciprocating guide carriage. It will be understood that the clutch interposed between the motor and the reel serves to prevent sufficient power being transmitted to unduly strain the cable. When it is desired to pay out and make up the cable from the rear or operator's end of the locomotive, the cable is passed upward and backward over the sheave 29 as shown in Fig. 3, and backward over the top of the locomotive as indicated by dotted lines in Fig. 1. Preferably a guide and support 37 is provided for the cable at a point near the rear end of the locomotive. It will be noted that the cable in this position passes through an opening 38 between the two arms 30 and 31. With the cable in the position last referred to, the operation of the locomotive is the same as that which has been before described and the description need not therefore be repeated.

I am aware that mechanisms have been heretofore devised for permitting a cable to be paid out or taken up at either end of the locomotive. So far as I am aware, however, all previous devices adapted for use with a horizontal reel have had parts which must be manually swung or shifted from one position to another. It will be observed that by my invention I have provided a construction which is not only very simple but one which requires no adjustment. The only thing which need be changed or moved is the cable itself.

What I claim is:

1. In a cable reeling mechanism for electric locomotives, the combination of a reel mounted for rotation about a horizontal transverse axis, a cable connected with the reel to be wound thereon, means for driving the reel, and a cable guiding mechanism mounted adjacent the reel, the said mechanism comprising two axially fixed sheaves mounted close to each other and on the same side of the reel, one of the sheaves being positioned to support the cable when it is paid out at one end of the locomotive and the other of the said sheaves being positioned with its top edge above the top edge of the reel to support the cable above the reel when it is being paid out and taken up at the other end of the locomotive.

2. In a cable reeling mechanism for electric locomotives, the combination of a reel mounted for rotation about a horizontal transverse axis, means for driving the reel, a cable connected with the reel to be wound thereon, a cable guiding carriage, means for causing the carriage to move backward and forward transversely at one side of the reel, and two axially fixed sheaves mounted one partly above the other on the same side of the reel and movable with the carriage, one of the said sheaves being positioned to support the cable when it is being paid out or taken up at one side of the reel, and the other being positioned with its top edge above the top edge of the reel to support the cable above the reel when it is being paid out or taken up at the other side of the reel.

3. In a cable reeling mechanism for electric locomotives, the combination of a reel mounted to rotate about a horizontal transverse axis, a cable connected with the reel to be wound thereon, means for driving the reel, a carriage reciprocably mounted at one side of the reel, means for moving the said reciprocable carriage, two axially fixed sheaves mounted in alinement for rotation about parallel transverse axes on the same side of the reel to move with the carriage and arranged to engage a cable between them to guide it onto the reel, one of the sheaves being positioned to support the cable when it is paid out or taken up from one end of the locomotive and the other of the sheaves being positioned with its top edge above the top edge of the reel to support the cable above the reel when it is paid out or taken up at the other end of the locomotive.

4. In a cable reeling mechanism for electric locomotives, the combination of a reel rotatable about a transverse horizontal axis, a cable connected with the reel to be wound thereon, means for driving the reel, a transversely reciprocable carriage mounted adjacent the reel, means operative with the reel for causing regular reciprocations of the carriage, two parallel transverse shafts mounted adjacent the reel, two sheaves each rotatably and slidably mounted on one of the said shafts, and means mounted on the carriage for holding the sheaves in the same plane and for reciprocating them along the shafts, one sheave serving to support a cable when it is paid out or taken up from one end of the locomotive and the other sheave serving to support the cable when it is paid out or taken up at the other end of the locomotive.

5. In a cable reeling mechanism for electric locomotives, the combination of a reel mounted for rotation about a horizontal transverse axis, a cable connected with the reel to be wound thereon, power mechanism for driving the reel, a transversely reciprocable carriage mounted adjacent the reel, means operable with the reel for causing regular reciprocations of the carriage, two sheaves mounted in the same plane to rotate about horizontal transverse axes and to reciprocate with the carriage, one sheave serving to support the cable when it is paid out or taken up at one end of the locomotive and the other sheave serving to support the cable when it is paid out or taken up at the other end of the locomotive, and guide rollers mounted to reciprocate with the carriage and with the sheaves, the said rollers being mounted with their axes in longitudinal vertical planes at the sides of the pulleys and serving to guide the cable and prevent transverse movement with respect to the pulleys.

6. In a cable reeling mechanism, the combination of a reel mounted for rotation about a horizontal axis, a cable adapted to be wound upon the reel, power mechanism for rotating the reel, a transversely reciprocable carriage at one side of the reel, means operable with the reel for causing regular reciprocation of the carriage, two sheaves mounted in the same plane for rotation about horizontal transverse axes and for reciprocation with the carriage, one of the sheaves serving to support the cable when it is being paid out or taken up at one end of the locomotive and the other sheave serving to support the cable when it is being paid out or taken up at the other end of the locomotive, and two rollers mounted with their axes in vertical longitudinal planes at opposite sides of the sheaves, the said rollers being positioned between the plane of the axes of the sheaves and the reel and serving to prevent transverse movement of the cable with respect to the sheaves as the cable is being wound upon or unwound from the reel.

7. In a cable reeling mechanism for electric locomotives, the combination of a reel mounted for rotation about a horizontal transverse axis, a cable connected with the reel to be wound thereon, power mechanism for driving the reel, a carriage reciprocably mounted at one side of the reel, means for causing the regular reciprocation of the carriage, two sheaves mounted with their planes coincident for rotation about horizontal transverse axes and for reciprocation with the carriage, one of the sheaves serving to support the cable when it is being paid out or taken up at one end of the locomotive, and the other sheave serving to support the cable when it is being paid out or taken up at the other end of the locomotive, two rollers rotatably mounted with their axes in vertical longitudinal planes at opposite sides of the sheaves, the said rollers being positioned between the plane of the axes of the sheaves and the reel and serving to prevent transverse movement of a cable with respect to the sheaves as it is being wound onto or unwound from the reel, and two other rollers rotatably mounted in longitudinal vertical planes at opposite sides of the sheaves, the said rollers being positioned on the opposite side of the plane of the axes of the sheaves from the first said rollers and serving to prevent transverse movement of the cable with respect to the sheaves as the cable passes between the sheaves toward or away from the reel.

In testimony whereof I affix my signature, in presence of two witnesses.

FREDERICK C. COSEO.

Witnesses:
 DUDLEY T. FISHER,
 E. T. SNIVELY.

Copies of this patent may be obtained for five cents each, by addressing the "Commissioner of Patents. Washington, D. C."